United States Patent
Horiuchi

(10) Patent No.: US 11,586,949 B2
(45) Date of Patent: Feb. 21, 2023

(54) STATE JUDGMENT DEVICE AND STATE JUDGMENT METHOD

(71) Applicant: FANUC CORPORATION, Yamanashi (JP)

(72) Inventor: Atsushi Horiuchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 605 days.

(21) Appl. No.: 16/680,799

(22) Filed: Nov. 12, 2019

(65) Prior Publication Data
US 2020/0151593 A1    May 14, 2020

(30) Foreign Application Priority Data
Nov. 13, 2018   (JP) .............................. JP2018-213071

(51) Int. Cl.
  G06N 5/04    (2006.01)
  G05B 23/02   (2006.01)
  G06N 20/00   (2019.01)

(52) U.S. Cl.
  CPC ............. *G06N 5/04* (2013.01); *G05B 23/024* (2013.01); *G06N 20/00* (2019.01)

(58) Field of Classification Search
  CPC ......... G06N 5/04; G06N 20/00; G05B 23/024
  See application file for complete search history.

(56) References Cited

U.S. PATENT DOCUMENTS

| | | | |
|---|---|---|---|
| 2009/0171481 A1* | 7/2009 | Chiang | G05B 23/027 700/81 |
| 2017/0028593 A1 | 2/2017 | Maruyama | |
| 2017/0031330 A1 | 2/2017 | Shiraishi et al. | |
| 2017/0326771 A1 | 11/2017 | Uchiyama | |
| 2018/0373234 A1* | 12/2018 | Khalate | G05B 23/0283 |
| 2020/0276680 A1* | 9/2020 | Green | H02K 7/14 |
| 2021/0011791 A1* | 1/2021 | Okanohara | G06N 3/08 |

FOREIGN PATENT DOCUMENTS

| | | | | |
|---|---|---|---|---|
| CN | 106409120 A | * | 2/2017 | ............. B25J 9/163 |
| JP | 04312826 A | * | 11/1992 | |
| JP | H6180269 A | | 6/1994 | |
| JP | 2001282348 A | * | 10/2001 | |
| JP | 2003251545 A | | 9/2003 | |

(Continued)

OTHER PUBLICATIONS

Inagaki, machine learning method, machine learning device, and fault prediction device and fault prediction system, 2017 google patents, machine translation of CN106409120A (Year: 2017).*

*Primary Examiner* — Rocio Del Mar Perez-Velez
*Assistant Examiner* — Yvonne Trang Follansbee
(74) *Attorney, Agent, or Firm* — Hauptman Ham, LLP

(57) ABSTRACT

A state judgment device includes: a data acquisition unit which acquires data related to an industrial machine; an energy state calculation unit which calculates an energy state related to driving of units of the industrial machine on the basis of the data related to the industrial machine acquired by the data acquisition unit; and an abnormal state estimation unit which estimates, on the basis of the energy state related to driving of the units of the industrial machine calculated by the energy state calculation unit, whether operation of the industrial machine is normal or abnormal.

11 Claims, 7 Drawing Sheets

(56) References Cited

FOREIGN PATENT DOCUMENTS

| | | |
|---|---|---|
| JP | 201530240 A | 2/2015 |
| JP | 201691312 A | 5/2016 |
| JP | 2017-30152 A | 2/2017 |
| JP | 2017-30221 A | 2/2017 |
| JP | 2017-202632 A | 11/2017 |

\* cited by examiner

FIG. 3

| OPERATING STATE | CONDITION FOR BEING JUDGED AS NORMAL | CONDITION FOR BEING JUDGED AS ABNORMAL |
|---|---|---|
| WHILE MOTOR FOR DRIVING INJECTION UNIT IS ACCELERATING | KINETIC ENERGY AND ELECTRIC ENERGY RELATED TO MOTOR ARE INCREASING OVER TIME | OTHER THAN THAT ON LEFT |
| WHILE MOTOR FOR DRIVING INJECTION UNIT IS OPERATING AT CONSTANT SPEED | KINETIC ENERGY AND ELECTRIC ENERGY RELATED TO MOTOR ARE CONSTANT OVER TIME | OTHER THAN THAT ON LEFT |
| WHILE MOTOR FOR DRIVING INJECTION UNIT IS DECELERATING | KINETIC ENERGY RELATED TO MOTOR IS DECREASING OVER TIME, AND ELECTRIC ENERGY IS INCREASING OVER TIME | OTHER THAN THAT ON LEFT |
| DURING HEATING OF NOZZLE | ELECTRIC ENERGY RELATED TO HEATING CYLINDER OF NOZZLE HAS INCREASED TO PREDETERMINED AMOUNT | OTHER THAN THAT ON LEFT |
| ⋮ | ⋮ | ⋮ |

FIG. 4

WARNING ICON

Correction coefficient a: 1.0
Correction coefficient b (offset): 2.0 mm

Warning 2.5 mm

AI 2.0
Abrasion score 0.4mm
-2.0

0 shots
50 shots

An abnormality has been detected. Check the driving unit of the injection cylinder.

WARNING MESSAGE

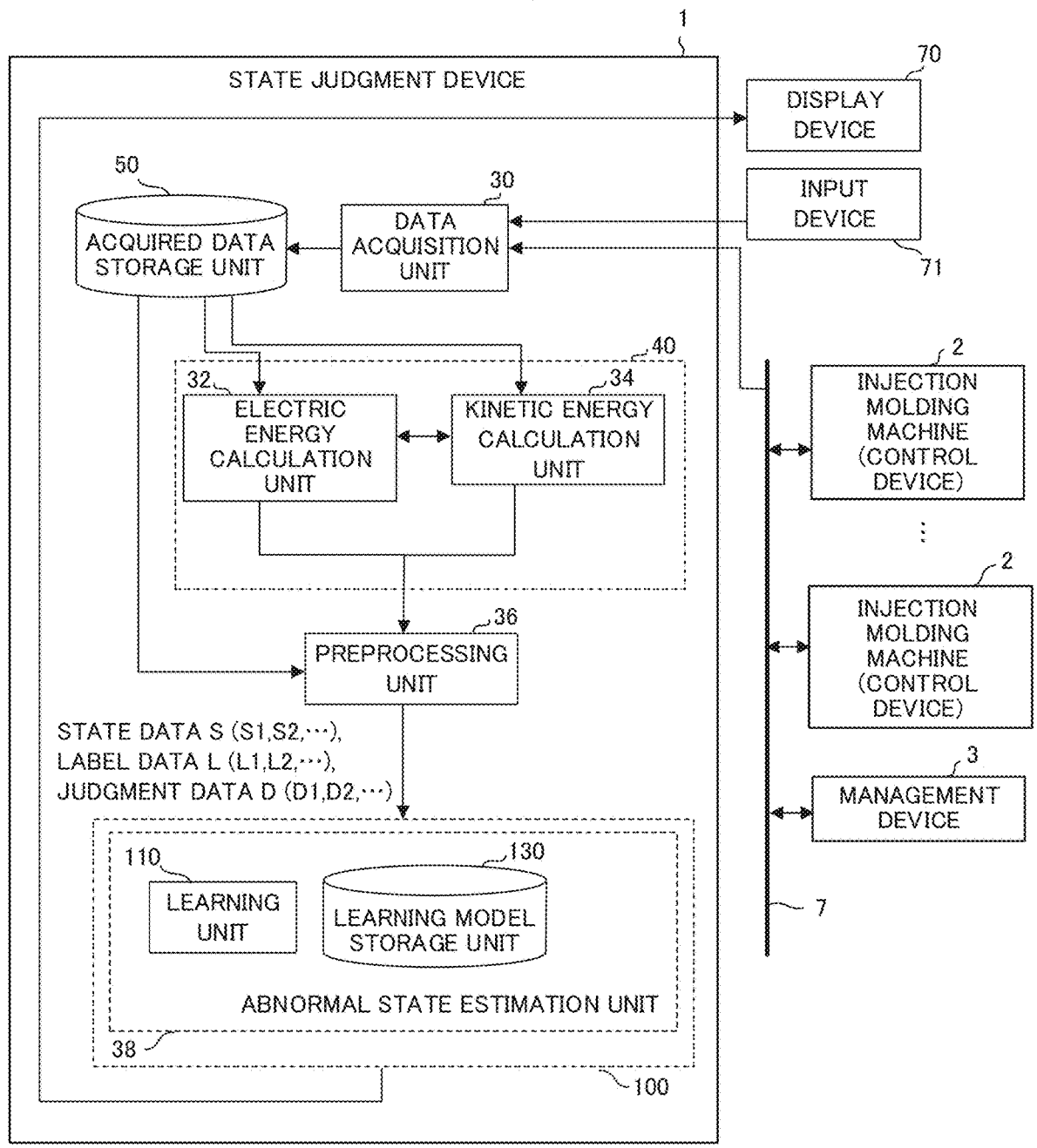

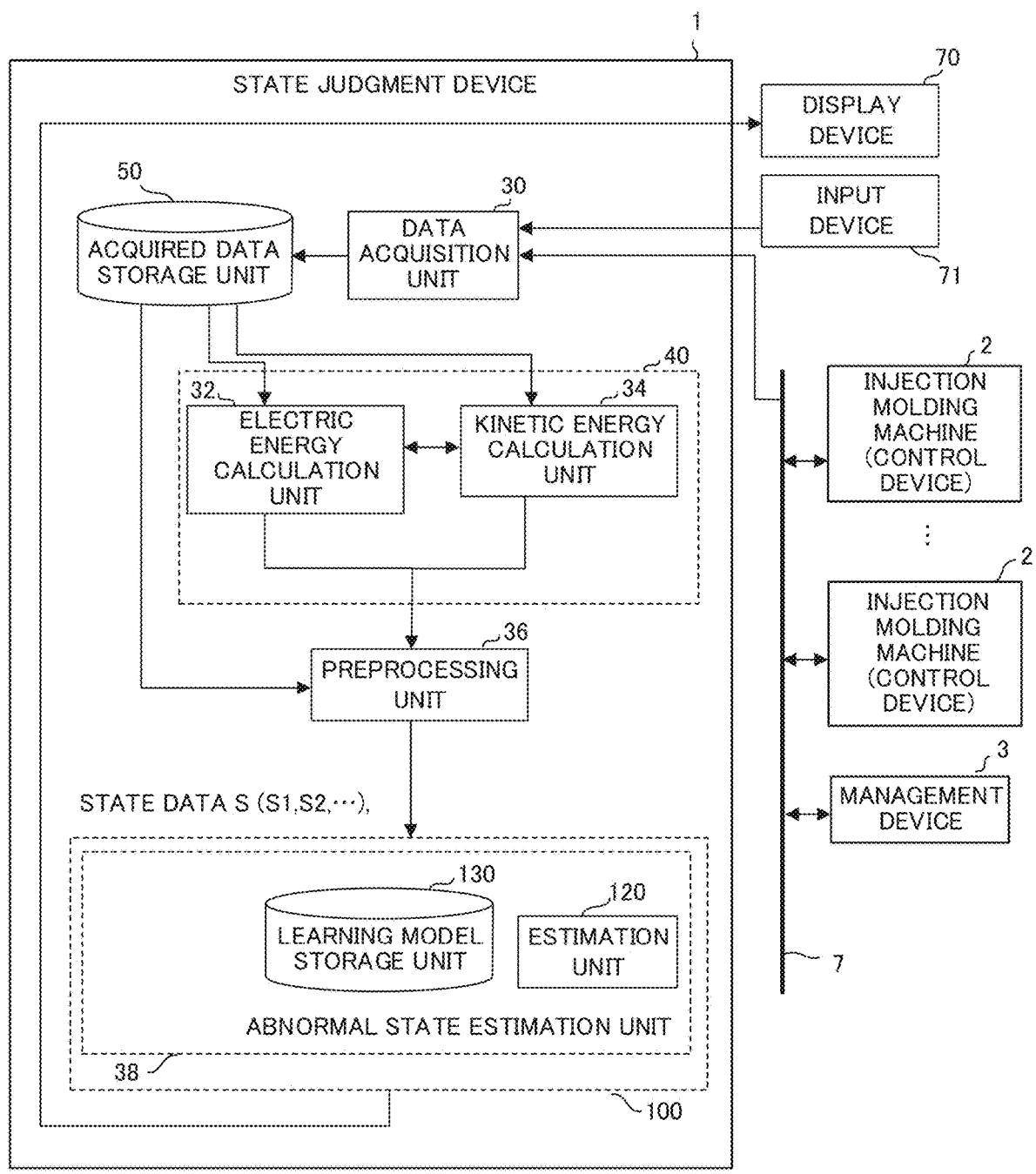

STATE JUDGMENT DEVICE AND STATE JUDGMENT METHOD

RELATED APPLICATIONS

The present application claims priority to Japanese Patent Application Number 2018-213071 filed Nov. 13, 2018, the disclosure of which is hereby incorporated by reference herein in its entirety.

BACKGROUND OF THE INVENTION

1. Field of the Invention

The present invention relates to a state judgment device and a state judgment method and, more particularly, to a state judgment device and a state judgment method for assisting in maintenance of an industrial machine powered by an electric motor.

2. Description of the Related Art

Maintenance of an industrial machine is performed periodically or in case of an abnormality. At the time of maintenance of an industrial machine, a maintenance staff member judges the presence or absence of an abnormality in the operating state of the industrial machine by using physical quantities indicative of the operating state of the industrial machine recorded during operation of the industrial machine and performs maintenance work, such as replacement of a part with an abnormality. Industrial machines include an injection molding machine, a machine tool, a mining machine, a woodworking machine, an agricultural machine, and a construction machine.

Judgment of the presence or absence of an abnormality using machine learning is publicly known. Examples of learning data used for machine learning include a measured value a control device of an industrial machine acquired from a sensor or a command value to control a driving unit of the industrial machine, that is, a current, a voltage, a position, a speed, and the like. There is disclosed means for performing machine learning using physical quantities directly obtained from sensor, such as a weight and a size and an appearance, a length, an angle, an area, and a volume calculated from image data, and a means for calculating optimum operating conditions. See, for example, Japanese Patent Application Laid-Open No. 2017-030152. There is also disclosed the process of performing supervised machine learning using a load on a driving unit, a resin pressure, an alarming history, a machine operation history, process monitoring data, and the like and discerning an abnormality. See, for example, Japanese Patent Application Laid-Open No. 2017-030221 and Japanese Patent Application Laid-Open No. 2017-202632.

However, in an industrial machine whose driving unit has different components, a discrepancy between a measured value from the machine and a numerical value as learning data input at the time of machine learning is large, and the accuracy of judgment through machine learning cannot be increased. Additionally, one learning model obtained through machine learning has not achieved accuracy enough to be versatilely used in a diverse variety of industrial machines.

There is variability in machine parts constituting an industrial machine, members to be handled by the industrial machine, and the like, and the variability may affect creation of a learning model. For example, the type of a machine part of a movable unit which is a component of an injection molding machine, the type of a resin which is a material for a molded article to be manufactured by the injection molding machine, or the type of equipment incidental to the injection molding machine, such as a mold, a mold temperature controlling machine, or a resin drying machine may be different from those when the learning model is created. If there is a difference, which may cause a discrepancy between measured values obtained from the machine and measured values used when the learning model is created. This may affect the accuracy of machine learning for judging presence or absence of abnormality.

There is available means for increasing the accuracy of machine learning by preparing, as learning conditions, diverse learning conditions equal in number to combinations of machine parts constituting an industrial machine and members to be handled by the industrial machine, when creating a learning model through machine learning. Machine learning performed based on diverse machine parts and diverse members, however, entails great cost. Additionally, raw materials, such as resin and a workpiece, need to be prepared at the time of operation of the industrial machine, and the cost of raw materials required to acquire learning data is also high. In addition, the work of acquiring learning data requires much time. Accordingly, there is a demand for collecting useful learning data efficiently.

In a machine not covered by learning conditions used when the learning model created, such as a machine different in a combination of a motor, a speed reducer, and a movable unit, an error in an estimation result obtained on the basis of the learned learning model is large. It is difficult to apply one learning model obtained from machine learning to a diverse variety of industrial machines widely.

Means for preparing a plurality of state judgment devices equal in number to the variety of industrial machines, the state judgment devices judging the presence or absence of an abnormality, and means for preparing a plurality of criteria for judgment of the presence or absence of an abnormality are not efficient.

Pieces of data acquired as learning data are physical quantities, such as a current, a voltage, a temperature, a position, and a speed, and represent only a part of the state of a machine as a learning object.

SUMMARY OF THE INVENTION

There is a need for a state judgment device and a state judgment method capable of discerning an abnormal state with high accuracy on the basis of data acquired from an industrial machine.

One aspect of the present disclosure derives kinetic energy or electric energy from various physical quantities (for example, the rotation speed and the current of a prime mover which drives an industrial machine) acquired from a control device and estimates the degree of abnormality of a driving unit of the industrial machine by performing machine learning using the energy as a feature quantity of learning data.

More specifically, the one aspect implements means for, even if a model of the industrial machine is different or equipment incidental to or a production material for the industrial machine is different (for example, the size of the machine is smaller or larger and different or components of the industrial machine are different), accommodating the difference in components by using kinetic energy of a driving unit as learning data and judging the presence or absence of an abnormality by versatilely and efficiently applying one learning model to diverse industrial machines.

Additionally, the one aspect provides means for displaying a message or an icon representing an abnormal state on a display device on the basis of the degree of abnormality obtained as an output of machine learning or for, if the degree of abnormality is equal to or more than a predetermine value, stopping operation of a machine movable unit to ensure the safety of a worker or stopping or decelerating a motor which drives the movable unit such that the movable unit operates in a safe state.

According to the one aspect of the present disclosure, there is provided a state judgment device for judging an operating state of an industrial machine, the state judgment device including: a data acquisition unit which acquires data related to the industrial machine; an energy state calculation unit which calculates an energy state related to driving of units of the industrial machine on the basis of the data related to the industrial machine acquired by the data acquisition unit; and an abnormal state estimation unit which estimates, on the basis of the energy state related to driving of the units of the industrial machine calculated by the energy state calculation unit, whether operation of the industrial machine is normal or abnormal.

According to another aspect of the present disclosure, there is provided a state judgment method for judging an operating state of an industrial machine, the state judgment method including: acquiring data related to the industrial machine; calculating an energy state related to driving of units of the industrial machine on the basis of the data related to the industrial machine; and estimating, on the basis of the energy state related to driving of the units of the industrial machine, whether operation of the industrial machine is normal or abnormal.

The present disclosure allows an abnormal state to be discerned with high accuracy even in an industrial machine different in configuration and scale.

BRIEF DESCRIPTION OF THE DRAWINGS

FIG. 3 is a chart showing an example of an abnormality judgment table.

FIG. 4 is a view showing a display example of an abnormal state.

FIG. 6 is a functional block diagram of the state judgment device according to the other embodiment of the present disclosure.

FIG. 7 is a functional block diagram of the state judgment device according to the still other embodiment of the present disclosure.

DETAILED DESCRIPTION OF THE PREFERRED EMBODIMENTS

One embodiment of the present disclosure will be described below with reference to the drawings.

Figure 1:
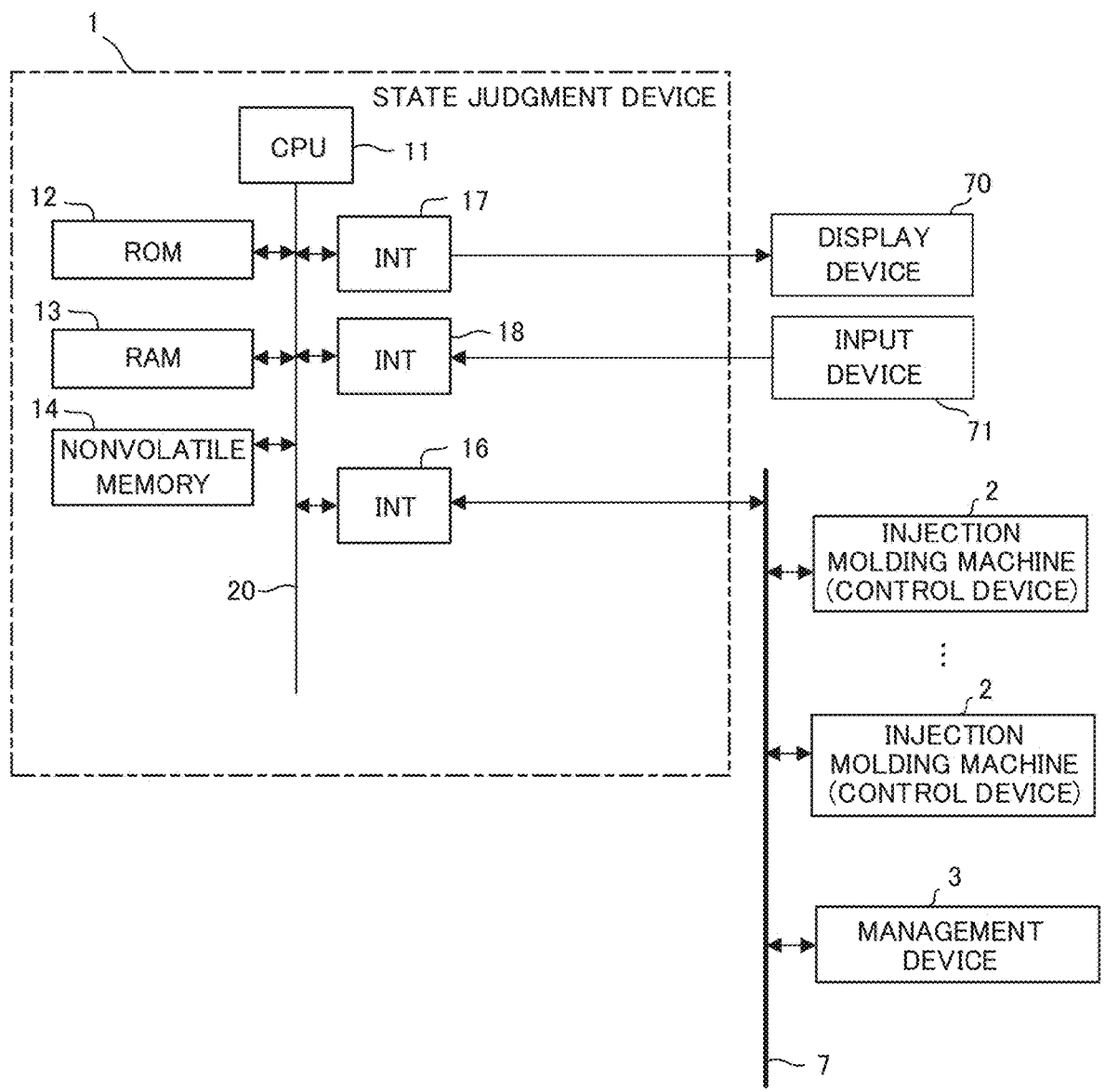
FIG. 1 is a hardware configuration diagram of a state judgment device according to one embodiment of the present disclosure.

FIG. 1 is a schematic hardware configuration diagram showing a main portion of a state judgment device according to the one embodiment. A state judgment device 1 according to the present embodiment can be implemented on, for example, a control device which controls an industrial machine. The state judgment device 1 according to the present embodiment can also be implemented such as a personal computer which is provided side by side with the control device that controls the industrial machine, a management device 3 which is connected to the control device over a wired/wireless network, an edge computer, a cell computer, a host computer, or a cloud server. The present embodiment will illustrate an example in a case where the state judgment device 1 is implemented as a computer connected to a control device which controls an injection molding machine over the wired/wireless network. Note that although the embodiments below will be described taking an injection molding machine as an example of an industrial machine, an injection molding machine, a machine tool, a robot, a mining machine, a woodworking machine, an agricultural machine, a construction machine, or the like can be adopted as an industrial machine which is an object of state judgment by the state judgment device 1 according to the present invention.

A CPU 11 which the state judgment device 1 according to the present embodiment includes is a processor which performs overall control of the state judgment device 1. The CPU 11 reads out a system program stored in a ROM 12 via a bus 20 and controls the whole of the state judgment device 1 in accordance with the system program. Temporal calculation data, various types of data input via an input device 71 by a worker, and the like are temporarily stored in a RAM 13.

A nonvolatile memory 14 is composed of, for example, a memory which is backed up by a battery (not shown), a solid state drive (SSD), or the like, and a storage state of the nonvolatile memory 14 is held even when the power to the state judgment device 1 is turned off. The following types of data are stored in the nonvolatile memory 14: a setup region where setup information related to operation of the state judgment device 1 is stored, data which is input from the input device 71, various types of data (for example, a model, the mass of and the material for a mold, the type of a resin, and a signal for identification of a process) which are acquired from an injection molding machine 2, pieces of time-series data on various types of physical quantities (for example, the temperature of a nozzle, the position, the speed, the acceleration, the current, the voltage, and the torque of a motor which drives the nozzle, the temperature of the mold, and the flow rate, the flow velocity, and the pressure of the resin) which are detected at the time of each molding operation of the injection molding machine 2, data which is read via an external storage device (not shown) or over the network, and the like. A program and various types of data stored in the nonvolatile memory 14 may be loaded into the RAM 13 at the time of execution/use. The system program including, for example, a publicly known analysis program for analysis of various types of data is written in advance in the ROM 12.

The state judgment device 1 is connected to a wired/wireless network 7 via an interface 16. At least one injection molding machine 2, the management device 3 that manages manufacturing work by the injection molding machine 2, and the like are connected to the network 7 and exchange data with the state judgment device 1.

The injection molding machine 2 is a machine which manufactures a product molded from a resin, such as plastic, and is a machine which melts a resin as a material, fills a mold with the resin (injects the resin into the mold), and performs molding. The injection molding machine 2 is composed of various machine parts, such as a nozzle which injects melt resin into the mold, a motor (prime mover), a transmission mechanism, a speed reducer, and a movable unit. The state of each unit is detected by a sensor or the like, and operation of each unit is controlled by a control device. For example, an electric motor, an oil hydraulic cylinder, an oil hydraulic motor, a pneumatic motor, an AC synchronous motor, an AC induction motor, a linear motor, an ultrasonic motor, a brushless DC motor, a stepping motor, or the like is used as the prime mover to be used in the injection molding machine 2. A ball screw, a gear, a pulley, a belt, or the like is used as the transmission mechanism to be used in the injection molding machine 2.

Pieces of data loaded into a memory, data obtained as a result of executing a program or the like, and the like are output via an interface 17 and are displayed on a display device 70. The input device 71 composed of a keyboard, a pointing device, or the like passes a command, data, and the like based on an operation by the worker to the CPU 11 via an interface 18.

Figure 2:
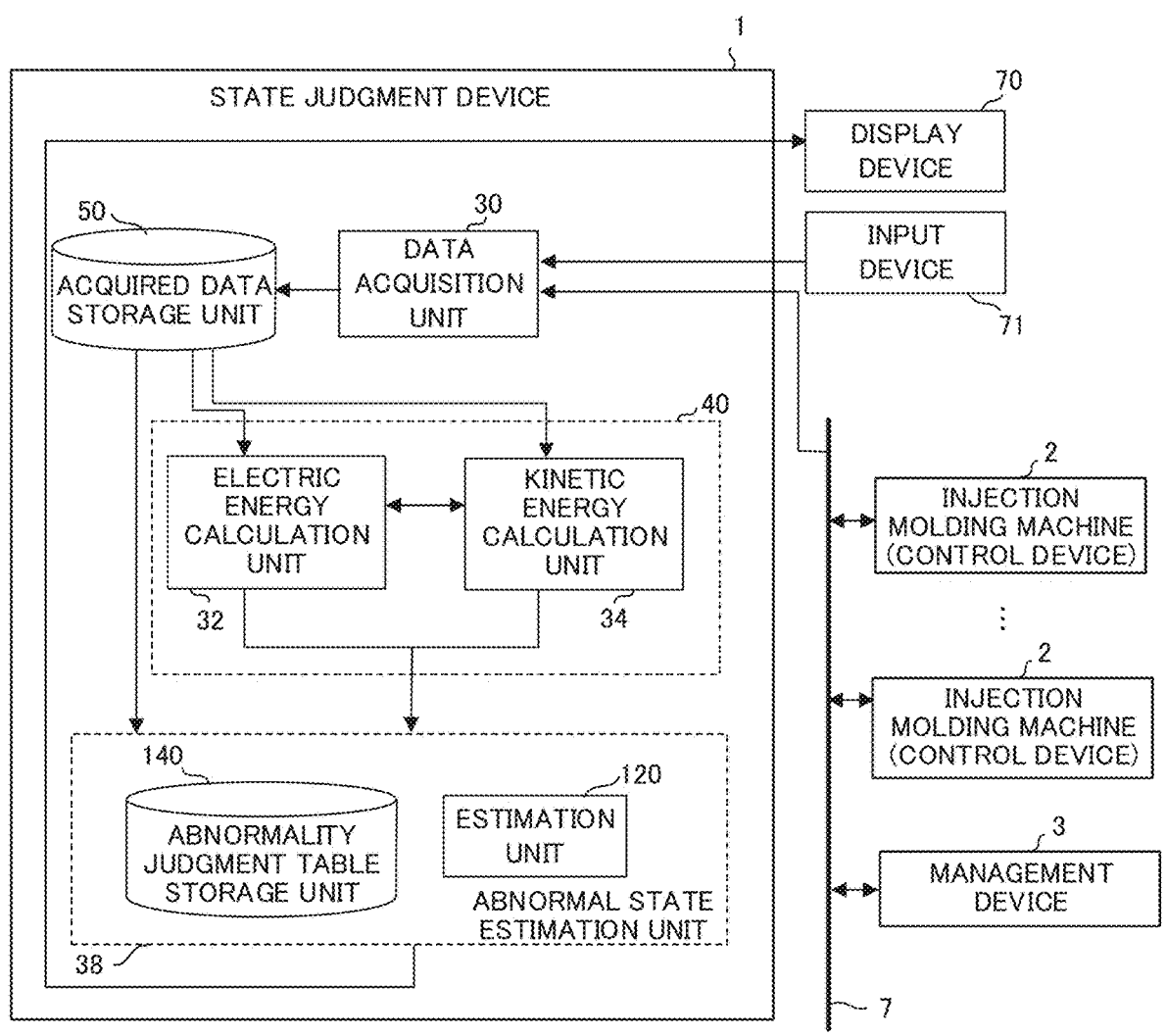
FIG. 2 is a functional block diagram of the state judgment device according to the one embodiment of the present disclosure.

FIG. 2 is a block diagram of the state judgment device 1 according to the one embodiment. Functional blocks shown in FIG. 2 are implemented when the CPU 11 that the state judgment device 1 shown in FIG. 1 includes executes the system program and controls operation of the units of the state judgment device 1.

The state judgment device 1 of the present embodiment includes a data acquisition unit 30, an energy state calculation unit 40, and an abnormal state estimation unit 38. The energy state calculation unit 40 includes an electric energy calculation unit 32 and a kinetic energy calculation unit 34, and the abnormal state estimation unit 38 includes an estimation unit 120.

An acquired data storage unit 50 where data acquired by the data acquisition unit 30 is stored and an abnormality judgment table storage unit 140 which stores an abnormality judgment table are provided in the nonvolatile memory 14.

The data acquisition unit 30 acquires various types of data input from the injection molding machine 2, the input device 71, and the like. The data acquisition unit 30 acquires, for example, various types of data (such as the model of the injection molding machine 2, the mass of and the material for the mold, and the type of the resin), pieces of time-series data on various types of physical quantities (such as the temperature of the nozzle, the position, the speed, the acceleration, the current, the voltage, and the torque of the motor that drives the nozzle, the temperature of the mold, and the flow rate, the flow velocity, and the pressure of the resin), and various types of data (such as information about the work of maintaining the injection molding machine which is input by the worker), and stores the pieces of data in the acquired data storage unit 50. The data acquisition unit 30 can acquire the pieces of data as command values given to the units by the control device of the injection molding machine 2, measured values obtained from the units by the control device, a detected value from, for example, a separately installed sensor, and the like. The data acquisition unit 30 may acquire data from an external storage device (not shown) or another device over the wired/wireless network.

The energy state calculation unit 40 calculates an energy state related to driving of the units of the injection molding machine 2 for pieces of data acquired by the data acquisition unit 30. The energy state calculation unit 40 according to the present embodiment includes the electric energy calculation unit 32 and the kinetic energy calculation unit 34.

The electric energy calculation unit 32 creates data by converting each pieces of data acquired by the data acquisition unit 30 into electric energy. The electric energy calculation unit 32 uses Formula 1 below to calculate, for example, electric energy E, the energy to be supplied to the motor of the injection molding machine 2. Note that, in Formula 1, P represents a power value, V represents a voltage value, I represents a current value, R represents a resistance value, and t represents a time.

$$E=Pt=VIt=RI^2t \qquad \text{[Formula 1]}$$

The electric energy calculation unit 32 calculates electric energy of physical quantities. Physical quantities, for which calculation is to be performed, are the temperature of the nozzle, the current/voltage and the torque of the motor that drives the nozzle, the temperature of the mold, the pressure of the resin, and the like. To convert a temperature into electric energy, a formula is obtained in advance through an experiment or the like. This is a formula for calculating electric energy required to raise the temperature of the nozzle or the mold to a predetermined temperature (which is generally obtained from a heat conduction equation and the formula for Joule's law). Electric energy is calculated using the formula. To convert the torque or the pressure into electric energy, a value obtained by subtracting, from electric energy supplied to the motor, kinetic energy (calculated by the kinetic energy calculation unit 34) related to driving by the motor, a loss in energy due to friction or the like, and an increase in potential energy, and the like is used for sake of convenience.

The kinetic energy calculation unit 34 converts each pieces of data acquired by the data acquisition unit 30 into kinetic energy and creates learning data. The kinetic energy calculation unit 34 uses Formula 2 below and calculates, for example, kinetic energy K related to driving of a movable unit acquired from the injection molding machine 2. Note that, in Formula 2, m represents the mass of the movable unit, v represents the speed of the movable unit, I represents moment of inertia, and ω represents a turning angle velocity of the motor that drives the movable unit.

$$K=\tfrac{1}{2}mv^2=\tfrac{1}{2}I\omega^2 \qquad \text{[Formula 2]}$$

The kinetic energy calculation unit 34 calculates kinetic energy based on a physical quantity such as the speed and the acceleration of the motor that drives the nozzle, the flow rate and the flow velocity of the resin.

The estimation unit 120 refers to the abnormality judgment table stored in the abnormality judgment table storage unit 140 and estimates the presence or absence of an abnormality in the injection molding machine 2, on the basis of an energy state related to driving of the units of the injection molding machine 2 which is calculated by the energy state calculation unit 40, that is, electric energy calculated by the electric energy calculation unit 32 and kinetic energy calculated by the kinetic energy calculation unit 34. An abnormality discernment condition for discerning an abnormality in a driving unit of the injection molding machine 2 is set in advance in the abnormality judgment table stored in the abnormality judgment table storage unit 140.

FIG. 3 shows an example of the abnormality judgment table stored in the abnormality judgment table storage unit 140. The abnormality judgement table includes relations between operating states of the injection molding machine 2 and abnormality discernment conditions. Operating states of the injection molding machine 2 are determined on the basis of data the data acquisition unit 30 acquired from the injection molding machine 2. Abnormality discernment conditions are associated with at least either one of a condition judged as normal in the operating state or a condition judged as abnormal. In the example in FIG. 3, an abnormality discernment condition is set such that, if the operating state of the injection molding machine 2 is "WHILE MOTOR FOR DRIVING INJECTION UNIT IS ACCELERATING", the injection molding machine 2 is judged as operating normally when kinetic energy and electric energy related to the motor are increasing over time and is judged as abnormal in the other cases. The estimation unit 120 estimates, using such an abnormality discernment condition, whether the injection molding machine 2 is operating normally or operating abnormally and produces output. An abnormality discernment condition set in the abnormality judgment table is set for each driving unit of the injection molding machine 2.

A result of estimation by the estimation unit 120 (for example, whether operation of the injection molding machine 2 is normal/abnormal) may be displayed on and output to the display device 70 or may be transmitted and output to a host computer, a cloud computer, or the like via the wired/wireless network (not shown). If the result of estimation by the estimation unit 120 is a predetermined state (for example, the estimation unit 120 estimates that operation of the injection molding machine 2 is abnormal), the state judgment device 1 may display and output a warning message and a warning icon on and to the display device 70, as illustrated in, for example, FIG. 4 or may output a command or the like to stop operation, decelerate, or limit the torque of the motor to the injection molding machine 2. Alternatively, a message and an icon to be displayed and an operation command in case of an abnormality may be changed based on the difference of each driving unit, for which an abnormality has been detected by the estimation unit 120.

In the state judgment device 1 with the above-described configuration, the estimation unit 120 estimates the state of the injection molding machine 2 using data obtained by converting data acquired from the injection molding machine 2 into kinetic energy or electric energy. Even if the type or the like of the injection molding machine 2 is different, whether operation is normal/abnormal can be judged on the basis of a simple condition based on common criteria, such as electric energy and kinetic energy.

Figure 5:
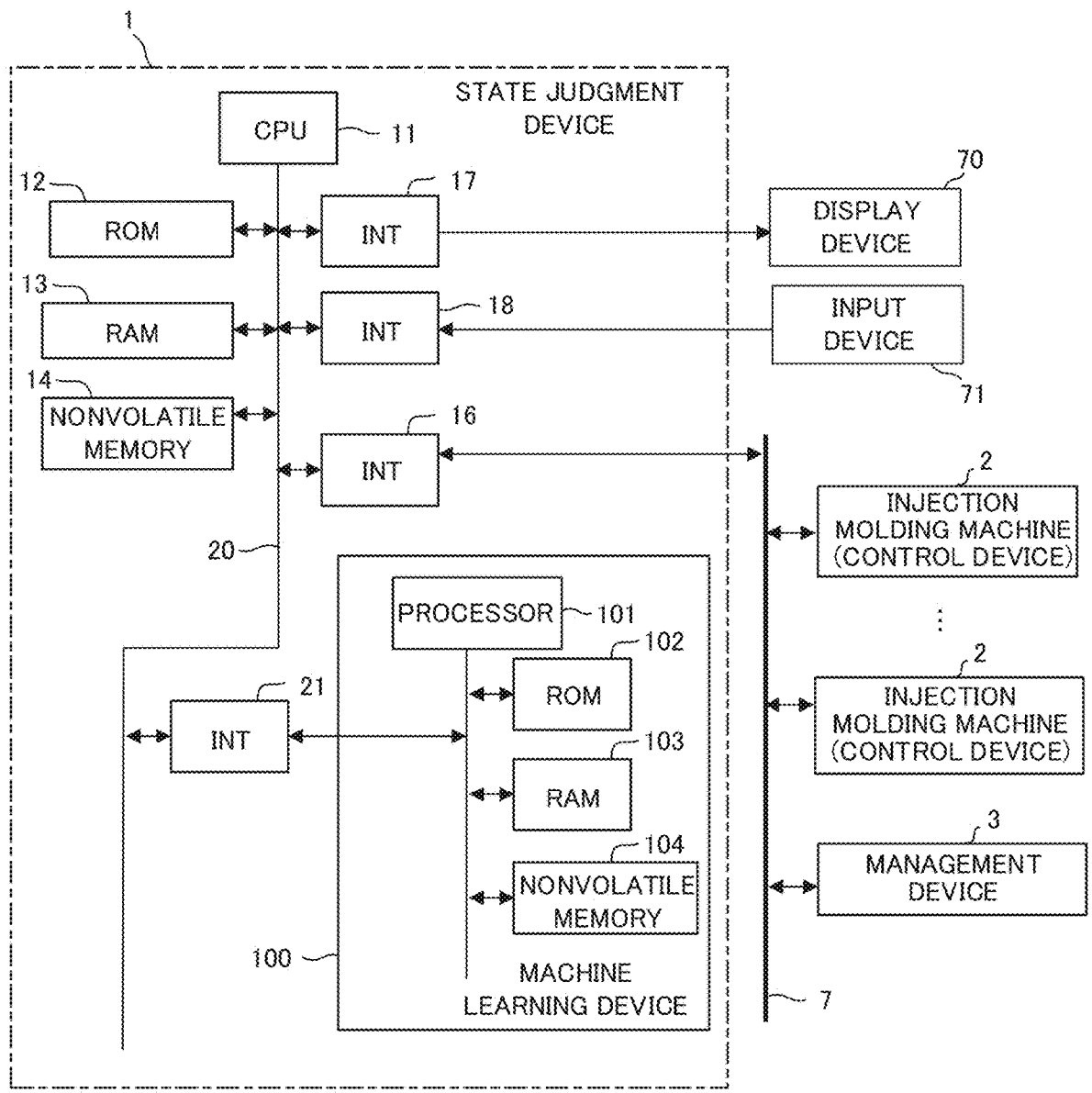
FIG. 5 is a hardware configuration diagram of each of state judgment devices according to another embodiment of the present disclosure and still another embodiment of the present disclosure.

FIG. 5 is a hardware configuration diagram showing a main portion of each of state judgment devices including machine learning devices according to another embodiment and still another embodiment of the present disclosure. A state judgment device 1 according to the present embodiments is configured in the same manner as in the above-described one embodiment except that the state judgment device 1 has a configuration related to a machine learning device 100. A system program including, for example, a program for controlling exchange with the machine learning device 100 is written in advance in a ROM 12 which the state judgment device 1 according to the present embodiments includes.

An interface 21 connects the state judgment device 1 to the machine learning device 100. The machine learning device 100 includes a processor 101 which controls the whole of the machine learning device 100, a ROM 102 which stores a system program and the like, a RAM 103 for temporary storage in each process related to machine learning, and a nonvolatile memory 104 which is used to store a learning model and the like. The machine learning device 100 can observe pieces of information (for example, various types of data (such as the model of an injection molding machine 2, the mass of and the material for a mold, and the type of a resin) and pieces of time-series data on various types of physical quantities (such as the temperature of a nozzle, the position, the speed, the acceleration, the current, the voltage, and the torque of a motor which drives the nozzle, the temperature of the mold, and the flow rate, the flow velocity, and the pressure of the resin)). The state judgement device 1 can acquire the pieces of information via the interface 21. The state judgment device 1 also acquires a processing result output from the machine learning device 100 via the interface 21, and stores and displays the acquired result or transmits the acquired result to another device via, for example, a network (not shown).

FIG. 6 is a functional block diagram of the state judgment device 1 and the machine learning device 100 according to the other embodiment. The state judgment device 1 shown in FIG. 6 has a configuration which is needed when the machine learning device 100 performs learning (a learning mode). Blocks shown in FIG. 6 can be implemented by the CPU 11 mounted in the state judgement device 1 and the processor 101 in the state judgement device 1 (FIG. 5). The CPU 11 and the processor 101 execute the respective system programs and control operation of the state judgement device 1 and the machine learning device 100.

The state judgment device 1 according to the present embodiment includes a data acquisition unit 30, an energy state calculation unit 40, a preprocessing unit 36, and an abnormal state estimation unit 38 which is provided on the machine learning device 100. The energy state calculation unit 40 includes an electric energy calculation unit 32 and a kinetic energy calculation unit 34, and the abnormal state estimation unit 38 includes a learning unit 110. An acquired data storage unit 50 is provided in a nonvolatile memory 14. Data acquired by the data acquisition unit 30 is stored in the acquired data storage unit 50. A learning model storage unit 130 is provided in a nonvolatile memory 104 of the machine learning device 100. Learning model the machine learning unit 110 constructed through machine learning is stored in the learning model storage unit 130.

Operation of the data acquisition unit 30, the energy state calculation unit 40, the electric energy calculation unit 32, and the kinetic energy calculation unit 34 in the present embodiment is the same as in the above-described one embodiment.

The preprocessing unit 36 creates learning data used for learning by the machine learning device 100 on the basis of data acquired by the data acquisition unit 30, data related to electric energy of units of the injection molding machine 2 which is calculated by the electric energy calculation unit 32, and data related to kinetic energy of the units of the injection molding machine 2 which is calculated by the kinetic energy calculation unit 34. The preprocessing unit 36 converts learning data into suitable format for process by the machine learning device 100 (for example, quantification or sampling). When the machine learning device 100 performs unsupervised learning, the preprocessing unit 36 creates, as learning data, state data S in a predetermined format for the learning. When the machine learning device 100 performs supervised learning, the preprocessing unit 36 creates, as learning data, a pair of the state data S and label data L in a predetermined format for the learning. When the machine learning device 100 performs reinforcement learning, the preprocessing unit 36 creates, as learning data, a pair of the state data S and judgment data D in a predetermined format for the learning.

The learning unit 110 performs machine learning using learning data created by the preprocessing unit 36. The learning unit 110 generates a learning model by performing machine learning using data acquired from the injection molding machine 2 by a publicly known machine learning method, such as unsupervised learning, supervised learning, or reinforcement learning and stores the generated learning model in the learning model storage unit 130. Examples of an unsupervised learning method to be performed by the learning unit 110 include, for example, an autoencoder and k-means clustering. Examples of a supervised learning method include, for example, a multilayer perceptron, a recurrent neural network, long short-term memory, and a convolutional neural network. Examples of a reinforcement learning method include, for example, Q-learning.

For example, the learning unit 110 can perform unsupervised learning based on learning data which is created by the preprocessing unit 36 on the basis of data acquired from the injection molding machine 2 in a normally operating state and generate the distribution of the data acquired in the normal state as a learning model. An estimation unit 120 according to the still other embodiment (to be described later) can estimate how much state data created by the preprocessing unit 36 on the basis of data acquired from the injection molding machine 2 deviates from data acquired when the molding machine 2 in normal state, using the learning model generated in the above-described manner, and calculate the degree of abnormality as an estimation result.

The learning unit 110 can also perform supervised learning for a boundary of discernment between normal and abnormal data. Learning data are based on the data acquired from the injection molding machine 2. Normal label is put on the data acquired when the injection molding machine 2 normally operating and abnormal label put acquired around a time of occurrence of an abnormality. The preprocessing unit 36 converts the data into learning data. The estimation unit 120 according to the still other embodiment (to be described later) can estimate whether state data created by the preprocessing unit 36 on the basis of data acquired from the injection molding machine 2 ranks as normal data or abnormal data, using the learning model generated in the above-described manner, and calculate a label value (normal/abnormal) and the reliability of the label value as an estimation result.

In the state judgment device 1 with the above-described configuration, the learning unit 110 performs learning using data acquired from the injection molding machine 2. The data for learning includes main data related to judgement of the degree of abnormality. The electric energy calculation unit 32 and the kinetic energy calculation unit 34 convert the main data into electric energy and kinetic energy. The electric energy and the kinetic energy have common criteria. Accordingly, efficient learning can be performed based on the common criteria even if the data acquired from a plurality of injection molding machines with different machine parts. A learning model created by the learning unit 110 can be used for estimation of the state of an injection molding by the estimation unit 120 (to be described later). Estimation using the model enables the judgement of normality/abnormality of the injection molding machine 2 on the basis of common criteria, that is, electric energy and kinetic energy, not only in the estimation of the injection molding machine used for the machine learning but also the estimation of the injection molding machine using the data acquired from the other injection molding machine.

FIG. 7 is a block diagram of the state judgment device 1 and the machine learning device 100 according to the still other embodiment. The state judgment device 1 according to the present embodiment has a configuration needed when the machine learning device 100 performs estimation (an estimation mode). Blocks shown in FIG. 7 are implemented by the CPU 11 of the state judgement device 1 in FIG. 5 and the processor 101 of the machine learning device 100 executing respective system programs and controlling units of the state judgement device 1 and the machine learning.

The state judgment device 1 according to the present embodiment includes a data acquisition unit 30, an energy state calculation unit 40, a preprocessing unit 36, and an abnormal state estimation unit 38 which is provided on the machine learning device 100, as in the above-described other embodiment. The energy state calculation unit 40 includes an electric energy calculation unit 32 and a kinetic energy calculation unit 34. The abnormal state estimation unit 38 includes an estimation unit 120. An acquired data storage unit 50 where data acquired by the data acquisition unit 30 is stored is provided in a nonvolatile memory 14. A learning model storage unit 130 which stores a learning model constructed through machine learning by a learning unit 110 is provided in the nonvolatile memory 104 of the machine learning device 100.

The data acquisition unit 30, the energy state calculation unit 40, the electric energy calculation unit 32, and the kinetic energy calculation unit 34 according to the present embodiment have the same functions as the data acquisition unit 30, the energy state calculation unit 40, the electric energy calculation unit 32, and the kinetic energy calculation unit 34 according to the above-described other embodiment. The preprocessing unit 36 according to the present embodiment creates state data S obtained through conversion into a unified format handled in the machine learning device 100 (for example, quantification or sampling), on the basis of data acquired by the data acquisition unit 30, data related to electric energy of units of an injection molding machine 2 calculated by the electric energy calculation unit 32, and data related to kinetic energy of the units of the injection molding machine 2 calculated by the kinetic energy calculation unit 34. The state data S created by the preprocessing unit 36 is used for estimation by the machine learning device 100.

The estimation unit 120 estimates the state of an injection molding machine using a learning model stored in the learning model storage unit 130, on the basis of the state data S created by the preprocessing unit 36. The estimation unit 120 according to the present embodiment inputs the state data S input from the preprocessing unit 36 for the learning model generated (whose parameters are determined) by the learning unit 110, thereby estimating and calculating the degree of abnormality related to the state of the injection molding machine or estimating and calculating a class (for example, normal/abnormal) to which the operating state of the injection molding machine belongs.

A result of estimation by the estimation unit 120 (for example, the degree of abnormality related to the state of the injection molding machine or the class to which the operating state of the injection molding machine belongs) may be displayed on and output to a display device 70 or may be transmitted and output to a host computer, a cloud computer, or the like via a wired/wireless network (not shown). If the result of estimation by the estimation unit 120 is a certain state (for example, in the case the degree of abnormality estimated by the estimation unit 120 exceeds a predetermined threshold set in advance or in the case the class, to which the operating state of the injection molding machine belongs, estimated by the estimation unit 120 as "abnormal"), the state judgment device 1 may display and output a warning message and a warning icon on and to the display device 70, as illustrated in, for example, FIG. 4 or may output a command or the like to stop operation, decelerate, or limit the torque of a motor to the injection molding machine. Alternatively, different message and icon can be displayed and an operation command in case of abnormality can be changed for each driving unit abnormality has been detected by the estimation unit 120.

In the state judgment device 1 with the above-described configuration, the estimation unit 120 estimates the state of the injection molding machine 2 using data obtained by converting data acquired from the injection molding machine 2 into kinetic energy or electric energy. The judgement on the basis of a common criterion, that is, energy, can be achieved with high accuracy even though there are differences among injection molding machines, such as the type or other attributes.

The embodiments have been described above are not limited to the above-described examples of the embodiments and can be carried out in various aspects by making appropriate changes.

For example, in each of the above-described embodiments, the state judgment device 1 and the machine learning device 100 have been described as devices having respective CPUs (processors). The machine learning device 100, however, may be implemented by the CPU 11 that the state judgment device 1 includes and a system program stored in the ROM 12.

The above-described embodiments each illustrate an example where the state judgment device 1 is mounted on a computer connected to the control device of the injection molding machine 2 via the network 7. The state judgment device 1, however, may be implemented by appropriately changing the layout of components, such as mounting only the abnormal state estimation unit 38 on a host computer and mounting a main body of the state judgment device 1 including the data acquisition unit 30, the electric energy calculation unit 32, and the kinetic energy calculation unit 34 on an edge computer.

In the above-described embodiments, normality/abnormality in the industrial machine is judged using the electric energy and kinetic energy respectively calculated by the electric energy calculation unit 32 and the kinetic energy calculation unit 34 in energy state calculation unit 40. The judgement of normality/abnormality also can be done only on kinetic energy. In this case, the energy state calculation unit 40 doesn't necessarily include electric energy calculation unit 32.

The invention claimed is:

1. A state judgment device for judging an operating state of an industrial machine, the state judgment device comprising:
a processor configured to
acquire data related to the industrial machine, wherein the industrial machine includes an injection molding machine,
calculate kinetic energy and electric energy related to driving of units of the industrial machine based on the data related to the industrial machine, wherein the kinetic energy is calculated based on (i) a speed and an acceleration of a motor to drive a nozzle of the injection molding machine, (ii) a flow rate of a resin, and (iii) a flow velocity of the resin, and the electric energy is calculated based on (iv) a temperature of the nozzle, (v) a current/voltage and torque of the motor that drives the nozzle, (vi) a temperature of a mold, and (vii) a pressure of the resin,
determine an energy state based on the calculated kinetic energy and the electric energy,
estimate, based on the energy state, whether operation of the industrial machine is normal or abnormal, and
in response to estimating the operation of the industrial machine being abnormal, output at least one command causing the industrial machine to stop the operation, decelerate the motor, or limit the torque of the motor.

2. The state judgment device according to claim 1, further comprising:
a memory storing an abnormality judgment table where an abnormality discernment condition for discerning an abnormality in a driving unit of the industrial machine is set, wherein
the processor is configured to judge whether the industrial machine is in a normal state or an abnormal state by judging whether said at least one of the kinetic energy or the electric energy satisfies the abnormality discernment condition stored in the abnormality judgment table.

3. The state judgment device according to claim 1, wherein
the processor is configured to
perform machine learning using said at least one of the kinetic energy or the electric energy, and
generate a learning model.

4. The state judgment device according to claim 1, further comprising:
a memory storing a learning model obtained through machine learning based on said at least one of the kinetic energy or the electric energy, wherein
the processor is configured to, using the learning model stored in the memory, perform estimation based on said at least one of the kinetic energy or the electric energy.

5. The state judgment device according to claim 3, wherein
the processor is configured to perform at least one of supervised learning, unsupervised learning, or reinforcement learning.

6. The state judgment device according to claim 2, wherein
the processor is configured to
estimate degree of abnormality related to the operating state of the industrial machine, and
cause a display to display a warning message in response to the degree of abnormality exceeding a predetermined threshold set in advance.

7. The state judgment device according to claim 2, wherein
the processor is configured to
estimate degree of abnormality related to the operating state of the industrial machine, and
cause a display to display a warning icon in response to the degree of abnormality exceeding a predetermined threshold set in advance.

8. The state judgment device according to claim 2, wherein
the processor is configured to
estimate degree of abnormality related to the operating state of the industrial machine, and output the at least one command causing the industrial machine to stop the operation, decelerate the motor, or limit the torque of the motor in response to the degree of abnormality exceeding a predetermined threshold set in advance.

9. The state judgment device according to claim 1, wherein
the processor is configured to acquire further data from a plurality of industrial machines connected over a wired or wireless network.

10. The state judgment device according to claim 1, wherein
the state judgment device is mounted on a management device which is connected to the industrial machine via a wired or wireless network and configured to manage the industrial machine.

11. A state judgment method for judging an operating state of an industrial machine, the state judgment method comprising:
acquiring data related to the industrial machine, wherein the industrial machine includes an injection molding machine;
calculating kinetic energy and electric energy related to driving of units of the industrial machine based on the data related to the industrial machine, wherein
the kinetic energy is calculated based on (i) a speed and an acceleration of a motor to drive a nozzle of the injection molding machine, (ii) a flow rate of a resin, and (iii) a flow velocity of the resin, and
the electric energy is calculated based on (iv) a temperature of the nozzle, (v) a current/voltage and torque of the motor that drives the nozzle, (vi) a temperature of a mold, and (vii) a pressure of the resin;
determining an energy state based on the calculated kinetic energy and the electric energy;
estimating, based on the energy state, whether operation of the industrial machine is normal or abnormal; and
in response to estimating the operation of the industrial machine being abnormal, outputting at least one command causing the industrial machine to stop the operation, decelerate the motor, or limit the torque of the motor.

* * * * *